United States Patent [19]

Hisey

[11] Patent Number: 5,235,231
[45] Date of Patent: * Aug. 10, 1993

[54] DYNAMOELECTRIC MACHINES HAVING ENERGY-EFFICIENT STATOR CONSTRUCTIONS AND METHOD

[76] Inventor: Bradner L. Hisey, 19325 Athos Pl., Saratoga, Calif. 95070

[*] Notice: The portion of the term of this patent subsequent to May 4, 2010 has been disclaimed.

[21] Appl. No.: 867,270

[22] Filed: Apr. 10, 1992

Related U.S. Application Data

[63] Continuation-in-part of Ser. No. 684,569, Apr. 12, 1991.

[51] Int. Cl.⁵ .............................................. H02K 1/12
[52] U.S. Cl. .................................... 310/259; 310/216; 29/596
[58] Field of Search ..................................... 310/42–45, 310/125, 216, 217, 254, 257, 258, 260, 261, 259; 29/596

[56] References Cited

U.S. PATENT DOCUMENTS

| | | | |
|---|---|---|---|
| 3,983,435 | 9/1976 | Sims | 310/259 |
| 4,395,815 | 8/1983 | Stanley et al. | 310/216 |
| 5,105,115 | 4/1992 | Shinryo et al. | 310/4 J X |

Primary Examiner—Steven L. Stephan
Assistant Examiner—E. H. To
Attorney, Agent, or Firm—Harold C. Hohbach

[57] ABSTRACT

In a radial gap dynamoelectric machine a composite stator ferromagnet having reduced losses is formed using fanfolded thin section metallic glass or electrical steel strips edge wound to form a ring-like magnetic structure surrounding separate stator tooth assemblies formed of traditional or thin-section sheet or powdered ferromagnetic materials. Alternative structures are described.

18 Claims, 2 Drawing Sheets

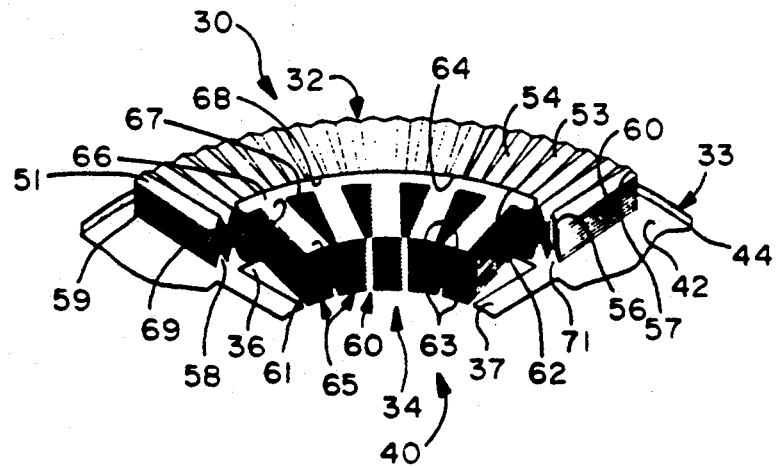
FIG.—2
FIG.—3
FIG.—4
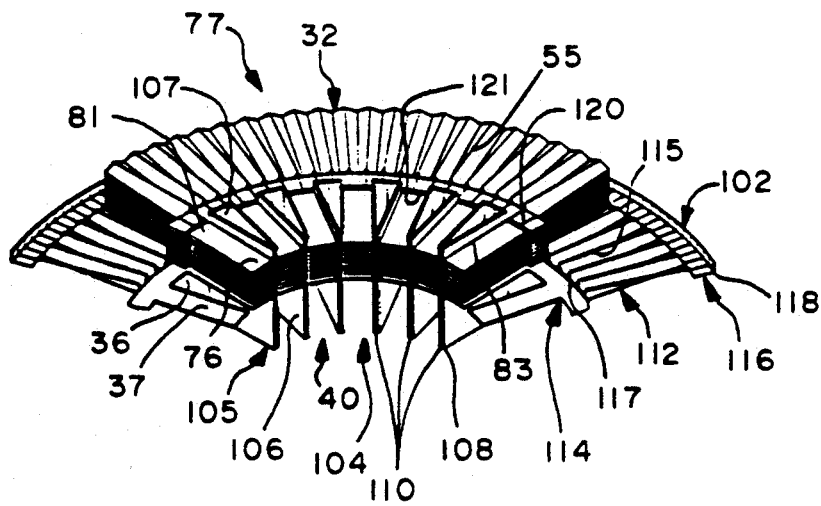
FIG.—5

DYNAMOELECTRIC MACHINES HAVING ENERGY-EFFICIENT STATOR CONSTRUCTIONS AND METHOD

This application is a continuation-in-part of application Ser. No. 07/684,569 filed Apr. 12, 1991.

INTRODUCTION

This invention relates to dynamoelectric machines having energy-efficient stator construction and method and more particularly to composite stator constructions utilizing low-loss amorphous ferromagnetic material (metallic glass) and/or thin section electrical steels.

BACKGROUND OF THE INVENTION

Stator lamination iron losses heretofore have dominated energy dissipation in most dynamoelectric machines. There is therefore a need to increase the efficiency of dynamoelectric machines particularly with respect to stator losses.

Amorphous ferromagnetic material lacks crystalline structure and has about one-tenth the iron losses of common crystalline iron alloys. It is formed in a sheet roughly 1 mil thick, as compared to 12-14 mils of common electrical steels) with a hardness in the range of 63-70 Rockwell C, like many tool steels, so that it is machined only by grinding, electric discharge machining or lasers, and those at risk of heat-inducing crystal formation and performance degradation. It may be slit and sheared economically. Punching, as for stator laminations, is impractical due to material hardness and very thin sections. Reduced losses can also be achieved with thin section (under the usual 12- 14 mils) electrical steels, most commonly silicon alloyed, which are more readily fabricated than are amorphous ferromagnetic materials.

OBJECTS OF THE INVENTION

The primary object of the present invention is to increase the efficiency of dynamoelectric machines by incorporating low-loss amorphous ferromagnetic material and/or thin-section electrical steels in their stators.

Another object is to reduce dynamoelectric machine size where the fundamental frequencies of alternating current in the composite stator constructions can be increased.

Additional objects and features of the present invention will appear from the following description in conjunction with the accompanying computer-generated wireframe drawings.

THE FIGURES

FIG. 2 is a cutaway isometric view of an axial segment of the composite stator construction of the dynamoelectric machine of FIG. 1.

FIG. 3 is an isometric view of an expanded segment of fanfolded elongate ferromagnetic strip stock used in the stator construction shown in FIG. 5.

FIG. 4 is an isometric view of a compressed segment of fanfolded elongate ferromagnetic strip stock forming an individual stator tooth used in the stator construction shown in FIG. 5.

FIG. 5 is an isometric view of an axial segment of an alternative composite stator construction utilizing a composite stator tooth assembly.

DESCRIPTION OF THE PREFERRED EMBODIMENTS

Figure 1:
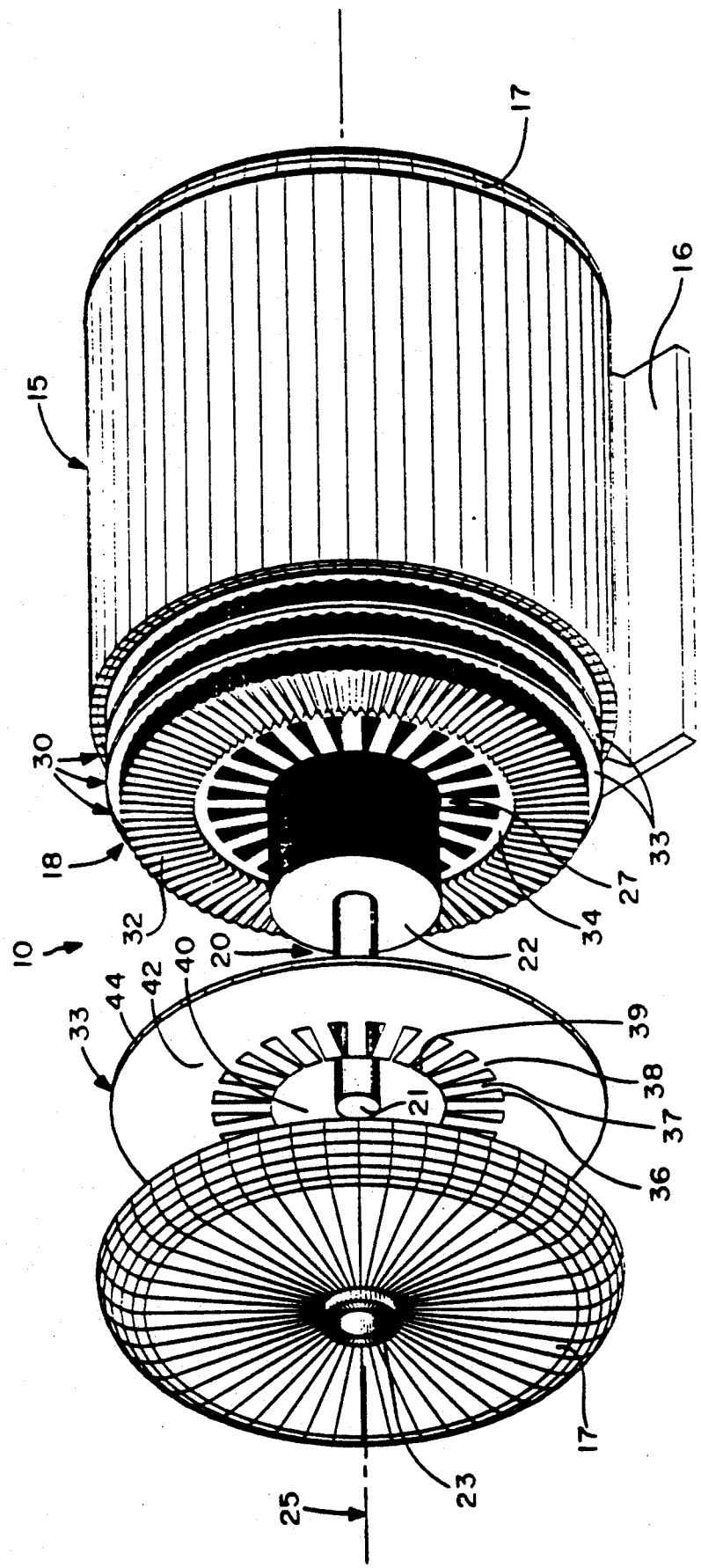
FIG. 1 is a partially exploded isometric view of a radial-gap dynamoelectric machine incorporating a composite stator construction of the present invention.

The radial-gap dynamoelectric machine 10 of the present invention as shown in FIG. 1 consists of an open ended cylindrical frame 15 mounted on a base 16, with the ends being closed by end bells 17. A composite stator construction assembly 18 is secured within the frame 15. A rotor assembly 20 comprised of a shaft 21 having a cylindrical laminated ferromagnetic stack 22 mounted thereon is rotatably mounted in bearing assemblies 23 provided in the end bells 17 for rotation about the dynamoelectric machine longitudinal axis 25. The rotor assembly 20 is separated from the composite stator assembly 18 by a radially narrow cylindrical air gap 27.

The composite stator construction or assembly 18 (hereinafter assembly) is comprised of at least one and generally a plurality of longitudinally spaced apart axial segments 30 (see FIG. 1). Each axial segment 30 is comprised of an outer fanfolded magnetic circuit ring axial segment 32, a stator support ring 33, and an inner stator tooth assembly axial segment 34.

A stator support ring 33 is exploded from the left end of FIG. 1 of the composite stator assembly 18. Each stator support ring 33 has circumferentially spaced apart keystone-shaped winding slots 36 forming teeth or poles 37 therebetween. The teeth 37 have roots 38 and tips 39. The inner margins or tips 39 of the teeth 37 generally define the cylindrical space, commonly called the stator bore 40, in which the rotor assembly 20 rotates. The teeth 37 are formed integrally with a ring 42 which is here provided with an outer rim or flange 44.

A cutaway portion of an axial segment 30 forming a part of a composite stator assembly 18 of the present invention is shown in FIG. 2. The primary characteristic of the composite stator assembly 18 of the present invention is the separation of the magnetic functions of the stator into two radially separate mechanical entities, the fanfolded stator magnetic circuit ring axial segments 32 and stator tooth assembly axial segments 34.

The fanfolded stator magnetic circuit ring axial segments 32 are formed from straight elongate strips 51 (the term strip is used generically hereinafter to refer to continuous, interrupted, single and plural strips formed singly or simultaneously in groups and disposed as described hereinbelow) having longitudinal axes, of low-loss amorphous ferromagnetic material or thin electrical steel which has been fanfolded, with fanfolds 53 extending across the longitudinal axis of the strip, with the fanfolds being in alternating directions. Such fanfolded materials are easily deflected in any direction about the nominal longitudinal axis of the unfolded strip. As shown in FIG. 1, the fanfolded ferromagnetic strip 51 has been extended, deflected or edge-wound and is closed end-to-end (joint not shown). Alternatively it can be edge-wound continuously as a helix to form an approximate circle (in actuality a polygon since the edges of the strip are straight). The folds 53 of adjacent turns of the fanfolded ferromagnetic strip 51 are in registration and corresponding faces 54 of adjacent turns are in close proximity to each other.

The closed continuum of each edge-wound layer of the extended fanfolded ferromagnetic strip 51 generally defines a plane with the fanfolds 53 being disposed alternately on opposite sides of the plane. The fanfolds 53 have faces 54 on opposite sides of each fold line 55. Each face 54 is bounded by two fold lines 55. Each face 54 has an inner edge 56 and an outer edge 57 which pass through the plane. The fanfolds 53 of a closed geometric figure so fabricated lie in planes (not illustrated) radial to the central axis of the closed geometric figure, which in the present invention is the longitudinal axis 25 of the dynamoelectric machine 10. The plane of the closed geometric figure is itself normal to the longitudinal axis 25 of the dynamoelectric machine. The fold angles (the angular deflection of the straight elongate strip from the longitudinal axis of the strip measured about the fold line 55) in the extended fanfolded strip 51 are less than 180 degrees so that faces adjacent to a given fold diverge from each other. Each face 54 is somewhat twisted between the inner margin 58 and outer margin 59 of the closed geometric figure or continuum as is most apparent at 60 in FIG. 2. Also the fold angles are greater at the inner margin 58 of the closed geometric figure than at the outer margin 59, the difference of fold angles being a measure of twist in each face 54.

Stated in another way, the strip 51 has fanfolds 53 therein extending across the strip at fold angles of less than 180° with respect to the longitudinal axis of its strip 51. The fanfolds 53 have fold lines 55 with faces 54 on adjacent sides of the fold lines 55. The strip 51 is deflected about the longitudinal axis 25 of the dynamoelectric machine 10 to form a closed geometric figure with the fold lines being disposed in planes substantially radial to the longitudinal axis of the dynamoelectric machine 10. The fanfolds 53 are disposed alternately on opposite sides of planes normal to said longitudinal axis 25 of said dynamoelectric machine 10. The fanfolds 53 have greater fold angles at the inner margins 58 of the geometric figure than at the outer margins 59. The strip 51 has superposed portions disposed closely adjacent to each other along the longitudinal axis 25 of the dynamoelectric machine 10 with the fanfolds 53 being in registration to form a substantially solid laminated magnetic flux path in the stator.

The fanfolds 53 in cross section need not be acute in the magnetic circuit ring axial segments 32 in the present invention. Alternatively, the fanfolds 53 in cross section can be in a variety of forms such as single or multiple circular arcs or polynominal or exponential forms. The pitch or circumferential frequency of the fanfolds 53 can be varied cyclically to reduce the air gap between the fanfolded stator magnetic circuit ring axial segment 32 and a polygonal external surface of a stator tooth assembly axial segment 34. In addition, a generally fanfolded elongate ferromagnetic strip 51 in a fanfolded stator magnetic circuit ring axial segment 32 may include lesser folds or deflections of the faces 54 (not shown) particularly in the neighborhood of the inner margin 58 and outer margin 59 as discussed hereinbelow to facilitate torque reaction force transfer from the stator tooth assembly axial segments 34 to the stator support rings 33. All such alternative fold patterns will hereinafter be referred to as fanfolding. The fanfolded stator magnetic circuit ring axial segment 32 as shown of the present invention has a number of desirable attributes. Though the magnetic flux path through the fanfolded stator magnetic circuit ring axial segment 32 is extended and reluctance is raised by the fanfolding, the high working permeability of useful ferromagnetic materials renders the effect of increased ferromagnetic path length negligible in comparison to the reluctance of a the armature-stator air gap 27 of the conventional dynamoelectric machine. The magnetic flux enters and leaves from inner margins 58 of the extended fanfolded ferromagnetic strip 51 and need not cross from layer to layer of the laminations. In addition, the stator tooth assembly axial segment 32 is radially elastic, so it may fitted to the external surface of the stator tooth assembly axial segment 34 during assembly of the composite stator assembly 18 so that the air gap is very small relative to the armature-stator air gap 27.

The stator tooth assembly axial segment 34 include slots 60, with teeth 61 disposed alternately between said slots 60. The teeth 61 in the stator tooth assembly axial segments 34 are joined to each other and supported in a variety of ways described hereinbelow. These slots 60 and teeth 61 register with the slots 36 and teeth 37 of the stator support rings 33, to which they are bonded for support, alignment, and transmission of torque.

Stator tooth axial assembly axial segments 34 are of axial length usually less than their external diameter 62, and have two generally plane ends 63 disposed generally normally to the dynamoelectric machine longitudinal axis 25, a generally cylindrical external surface 64 extending between the two plane ends 63, an internal surface 65 comprised of alternately disposed slots 60 and teeth 61 projecting towards the dynamoelectric machine longitudinal axis 25.

The stator tooth assembly axial segment 34 shown in FIG. 2 is formed of stacked laminated punchings 66 of conventional or thin electrical steel sheets having circumferentially spaced apart slots 60 and teeth 61 with intertooth links 67 at the perimeter to form a continuous external edge 68. The intertooth links 67 are radially narrow relative to the radial length of the teeth 61. The intertooth links 67 maintain intertooth geometry and resist magnetic compression. The stator tooth assembly segment punching 66 may be divided radially into smaller segments for convenience in punching.

An alternative stator tooth assembly axial segment 34 Visually identical to the stator tooth assembly axial segment 34 in FIG. 2 may be formed from an elongate strip of ferromagnetic material by notching the winding slots 60 from one edge of the strip to leave teeth 61 between. The opposite continuous edge 68 of the strip, comprised of teeth roots 69 and the intertooth links 67 can be passed between rollers (not shown) which thin and lengthen the continuous edge 68 so that the strip turns in a circle generally in the original plane of the strip. This strip so formed may be edge wound as a helix to form stator tooth assembly axial segments 34. If the slots 60 and teeth 61 have the same width, or otherwise complementary geometry, two notched strips may be formed from a single strip without waste. This helical stator tooth assembly 34 construction is particularly well adapted to fabrication from thin-section electrical steels. The continuous edge 68 thinning needed is of the order of 10% of the strip thickness to turn the edge notched stator tooth strip in the diameter of a typical stator tooth assembly axial segment 34 and interferes little with resistance of the stator tooth assembly axial segment 34 to magnetic compression from rotor-stator attraction. The reluctance of the stator tooth assembly segment 34 is raised little by the edge thinning, particularly if thinning is limited to the intertooth links 67. The required edge thinning is within usual limits for single-pass thickness reduction of electrical steels.

Another alternative stator tooth assembly segment (not shown) performing the same functions as the stator tooth assembly axial segment 34 shown in FIG. 2 is formed from pressed and bonded ferromagnetic powder. Ferromagnetic powder offers greater latitude in slot 60 and tooth 61 configuration at the cost of lower permeability and mechanical strength.

Components of the stator tooth assembly axial segment 34 of FIG. 2 are internally bonded in a suitable manner such as by an epoxy resin. The stator tooth assembly axial segment 34 has its teeth 60 bonded in registration to the teeth 37 of the adjacent stator support ring 33. Torque reaction on the stator teeth 61 is transmitted into the stator support ring teeth 37 and thence through the stator support ring 33 to the dynamoelectric machine frame 15. The fanfolded stator magnetic circuit ring axial segment 32, since it is a radially and torsionally elastic structure, may be supported by adhesive bonding the inner edge 56 to the external continuous edge 68 of the stator tooth assembly axial segment 34. Thus supported, the magnetic circuit ring axial segment 32 need not transmit torque reaction stresses.

Where the axial faces of the fanfolded stator magnetic circuit ring axial segments 32 abut the generally plane stator support ring 33 small triangular air gaps 71 (see FIG. 2) increase the reluctance of the path from the surface formed assembly axial segment 34 to the inner edges 56 of the fanfolded stator magnetic circuit ring axial segments 32. The axial length of the air gaps 71 may be reduced by increasing the interfold pitch of the fanfolded stator magnetic circuit ring axial segment 32. In order to overcome the disadvantage of the occurrence of the small triangular air gaps 71, an alternative embodiment of the axial segment 30 of the composite stator assembly 18 is shown in FIGS. 3, 4 and 5.

The synthesis of an individual stator tooth 76, utilized in the alternative axial segment 77 in FIG. 5, from fanfolded ferromagnetic material (in this case the folds must be sharp) is shown in FIGS. 3 and 4. The fanfolded ferromagnetic strip 80 has a plurality of faces 81 with each face 81 being bounded by two fold lines 82 and two side edges 83. The fanfolded strip 80, having a width equal to the desired stator tooth 61 width, is folded so that it has an interfold length equal to the desired stator tooth 61 length. The fanfolded strip 80 is compressed into a rectangular prism or stack to form an individual fanfolded stator tooth 76 (see FIG. 4) by bringing the strip faces 81 adjacent to each fold line 82 into close proximity to each other (a substantially 180° fold). Such an individual fanfolded tooth 76 has a stack height equal to the axial distance between stator support rings 33.

A composite stator assembly 18 axial segment 77 incorporating individual stator tooth fanfolded stator teeth 76 is shown in FIG. 5. It consists of a fanfolded stator magnetic circuit ring axial segment 32, a fanfolded stator support ring 102, and composite stator tooth assembly axial segment 104 comprised of individual fanfolded stator teeth 76 and structural plastic longitudinal support members or slot liners 105 disposed therebetween. The slot liners 105 have radially deep side walls 106 joined by outer walls 107. The slot liners 105 can be molded of fiber filled structural plastic material or equivalent. Such a slot liner 105 has considerable mechanical strength because it functions as deep-section channel beam. Winding retention lips (not shown) may be molded into free edges 108 of the slot liners 105.

The slot liners 105 are disposed longitudinally parallel to the dynamoelectric machine longitudinal axis 25 in a circular array 110 with the free edges 108 of the slot liners adjacent to the stator bore 40. The circumferential spacing of the slot liners 105 is determined by placing the slot liners in the slots 36 of the fanfolded stator support ring 102. Fanfolded individual stator teeth 76 are placed in the gaps between the slot liners 105 with the faces 81 of the fanfolded individual stator teeth 76 disposed normally to the dynamoelectric machine axis 25. The ferromagnetic strip side edges 83 of fanfolded individual stator teeth 76 are bonded to the side walls 106 of the slot liners 105 with adhesives to bear the rotor-stator magnetic attraction and torque reaction forces as shear loads on the side walls 106 of the slot liners 105. Torque and tension loads are transmitted from the fanfolded individual stator teeth 76 into the slot liners 105 and into the stator support ring 102, to which they are bonded, and thence to the dynamoelectric machine frame 15. Circumferential flexing of slot liners 105 between stator support rings, 102, is minimized by limiting axial spacing between adjacent stator support rings, 102, and strengthening slot liner side walls 106 and outer walls 107.

The assembly of slot liners 105 and fanfolded individual stator tooth segments 76 forms a composite stator tooth assembly axial segment 104 much like the punched or wound strip forms of FIG. 2. A plurality of composite stator tooth assembly segments 104 may be assembled on a single circular array 110 of structural plastic longitudinal support members 105, each of length generally equal to that of the composite stator assembly 18, to form a complete composite stator tooth assembly.

The reluctance of the triangular air gaps 71 where the stator support rings 102 abut the fanfolded stator magnetic circuit ring segments 32 is nearly eliminated by the construction of a fanfolded stator support ring 102 as shown in FIG. 5. In this construction the stator support ring is divided into middle fanfolded 112, inner plane 114, and outer plane 116 radial portions. The middle portion 112 is of fanfolded structure formed, as by stamping, with indentations which mate with the fanfolds of the fanfolded stator magnetic circuit ring axial segment 32. The inner portion 114 of the stator support ring 102 remains plane and has an axial projection of slots 60 and teeth 61 equivalent to that of a single lamination of the stator tooth assembly axial segment 34, and the outer portion 116 remains plane or is formed as described hereinbelow. This construction reduces the design length of the composite stator assembly 18 and rotor assembly 20. The inner margin of the fanfolded middle portion 112 of the fanfolded stator support rings 102 passes through the plane of the inner portion 114 between each fold 115 of the fanfolded mid portion 112 of the fanfolded stator support ring 102.

At this crossover or junction point 117 the fanfolded middle portion 112 and plane inner portions 114 meet and torque reaction forces from the stator tooth assembly axial segment 34 are transmitted outward in the fanfolded stator support ring 102. These concentrated local forces may be reduced by increasing fanfold pitch, or by modifying the stamping or molding processes to increase the circumferential extent of the junction 117 of fanfolded mid portion 112 and plane inner portion 114 of the fanfolded stator support ring 102. As a corollary the inner margin 58 of the faces 54 of the fanfolded stator magnetic circuit ring 32 may be locally deflected from their usual sharp crossing angle of the plane normal to the dynamoelectric machine longitudinal axis 25 at the junction 117 toward said normal plane to improve the fit of said faces 54 to such modified stator support rings 102. Stator support rings with fanfold axial depth less than that of adjacent fanfolded magnetic circuit ring axial segments 32, in a sense hybrids of plane 33 and fanfolded forms 102, may be devised to improve torque reaction transmission. Multiple plane or fanfolded stator support rings 33 and 102, respectively, may be used adjacent to each other to reduce torque reaction forces in each.

The use of ferromagnetic stator support rings 33, 102, contributes to the iron losses of a composite stator assembly 18. The local stress levels in fanfolded stator support rings 102 can be high at junction points 117, as described above, and exacerbated by sharp edges adjacent to the cross over point 117 produced by stamping the fanfolded mid portion 112.

Fiber-filled plastics have strengths approaching those of electrical steels. A molded fiber-filled plastic fanfolded stator support ring 102 may have more favorable stress tolerance at the junction points 117 of its plane inner portion 114 and fanfolded mid portion 112 because of its molded nature.

The outer portion 116 or rim of the stator support rings 33, 102 may be formed as appropriate to meet mounting and cooling requirements of the dynamoelectric machine.

The composite stator tooth assembly axial segments 104 of FIG. 5, including open slot liner 105 channels, lack the compressive strength of the all-metal stator tooth assembly axial segments 34 of FIG. 2.

A stator magnetic compression ring segment 120 of edge-wound flattened ferromagnetic wire is shown in FIG. 5 radially interposed between the fanfolded stator magnetic circuit ring axial segment 32 and the composite stator tooth axial assembly 104 to absorb compressive stresses arising in rotor-stator magnetic attraction, reducing the compressive magnetic attraction forces on the composite stator tooth assembly axial segments 104. The stator magnetic compression ring axial segment 120 may also be used with powdered metal stator tooth assembly segments (not shown) to limit compressive stresses. While this stator magnetic compression ring axial segment 120 is shown as circular, it may be polygonal to reduce air gaps between folded outer margins of individual fanfolded stator teeth 76, which are plane, in composite stator tooth assembly segments 104, and the inner margins 58 of fanfolded stator magnetic circuit ring axial segments 32, which may assume a polygonal axial projection. With typical dynamoelectric machine geometries these air gaps may be small relative to the rotor-stator air gap 27. Stator magnetic compression rings axial segments 120 may be formed of a plurality of interleaved flattened wires wound simultaneously (not shown).

Plane and fanfolded stator support rings 33, 102 respectively, of molded plastic provide most of the electrical isolation necessary to eliminate circulating currents within the composite stator structure 18, with the exception of a requirement for thin insulating layers between abutting generally cylindrical or polygonal surfaces of stator tooth assembly axial segments 34, 104, and fanfolded stator magnetic circuit ring axial segments 32, and stator magnetic compression ring axial segments 120. These thin insulating layers (not shown) are traditionally provided by fine layers of metal oxide or thermosetting resins.

It may be seen that the preferred embodiments of composite stator assembly 18 constructions disclosed in this invention may have a variety of forms assembled in various combinations from the components herein disclosed. The fanfolded stator magnetic ring axial segments 32 may be amorphous ferromagnetic material or electrical steel. Stator support rings 33, 102, may be ferromagnetic metal or structural plastic. The stator tooth assembly axial segments 34 may be punched from ferromagnetic sheet stock, wound from notched ferromagnetic strip stock, molded from ferromagnetic powder; or fanfolded as individual stator tooth segments 76 from ferromagnetic strip stock and supported by structural plastic longitudinal support members 105. Ferromagnetic stator magnetic compression ring axial segments 120 may be included in the composite stator assembly 18 as appropriate to resist rotor-stator magnetic attraction.

The composite stator structures described hereinabove can reduce stator iron losses by about 65 percent with amorphous ferromagnetic material stator magnetic circuit ring axial segments 32 together with punched electrical steel stator tooth assembly axial segments 34 and punched ferromagnetic stator support rings 33, 102, of common thickness. Greater reduction of iron loss may be achieved with molded structural plastic fanfolded stator support rings 102 and stator tooth assembly axial segments 34 formed as helical windings from thin ferromagnetic strip stock. With molded structural plastic stator support rings 102 and fanfolded individual stator teeth 76 supported by structural plastic longitudinal support members 105 the reduction of stator iron losses approaches 80 percent. Where the fundamental frequency of alternating current applied to the composite stator structures described in the present invention can be raised, very significant reductions of dynamoelectric machine size may be achieved.

What is claimed is:

1. In a radial-gap dynamoelectric machine having a longitudinal axis having a stator structure, an elongate ferromagnetic strip having first and second edges and having a longitudinal axis, said strip having fanfolds therein extending entirely across said strip from the first edge to the second edge, said fanfolds of said strip having fold angles of less than 180°, said fanfolds having fold lines with faces between the fold lines, said strip being deflected abut the longitudinal axis of the dynamoelectric machine to form a closed geometric figure with the fold lines being disposed in planes substantially radial to the longitudinal axis of said dynamoelectric machine, said fanfolds being disposed alternately on opposite sides of planes normal to said longitudinal axis of said dynamoelectric machine, said fanfolds having greater fold angles at the inner margin of the geometric figure than at the outer margin, said strip having superposed portions disposed closely adjacent to each other along the longitudinal axis of the dynamoelectric machine with the fanfolds being immediately adjacent each other and superposed in registration to form a substantially solid laminated magnetic flux path in the stator.

2. A structure as in claim 1 wherein the elongate ferromagnetic strip is deflected in a plane normal to the longitudinal axis of the dynamoelectric machine to form a closed figure whose projection in a plane normal to the longitudinal axis of the motor is a polygon.

3. A structure as in claim 1 wherein the elongate ferromagnetic strip is continuous over more than one turn about the longitudinal axis of the dynamoelectric machine and is wound into a helix whose projection in a plane normal to the longitudinal axis of the dynamoelectric motor approximates a polygon.

4. A structure as in claim 1 wherein said elongate ferromagnetic strip is in the form of a plurality of separate ferromagnetic strips.

5. A structure as in claim 1 wherein the elongate ferromagnetic strip is deflected in a plane normal to the longitudinal axis of the dynamoelectric machine to form a closed figure whose projection in a plane normal to the longitudinal axis of the dynamoelectric machine approximates a circle.

6. A structure as in claim 1 wherein the elongate ferromagnetic strip is continuous over more than one turn about the longitudinal axis of the dynamoelectric machine and is wound into a helix whose projection in a plane normal to the longitudinal axis of the dynamoelectric machine approximates a circle.

7. A structure as in claim 4 wherein said plurality of strips are wound into a helix whose projection in a plane normal to the longitudinal axis of the dynamoelectric machine approximates a circle.

8. A structure as in claim 1 together with a dynamoelectric machine frame, a plurality of stator tooth assembly axial segments, a plurality of spaced apart fanfolded stator magnetic circuit ring axial segments disposed around the stator tooth assembly axial segments and a plurality of stator support rings bonded to said stator tooth assembly axial segments and secured to said motor frame.

9. A structure as in claim 8 wherein said plurality of stator support rings are disposed normally to the longitudinal axis of the dynamoelectric machine and are spaced apart along the longitudinal axis of the dynamoelectric machine, said stator support rings being formed of ferromagnetic material.

10. A structure as in claim 8 wherein said plurality of stator support rings are disposed normally to the longitudinal axis of the dynamoelectric machine and are spaced apart along the dynamoelectric machine longitudinal axis, said stator support rings formed of structural plastic material.

11. A structure as in claim 8 together with a plurality of magnetic compression rings of flattened helically wound ferromagnetic wires disposed axially between the radially spaced apart fanfolded stator magnetic circuit ring axial segments and the stator tooth assembly axial segments and axially between adjacent stator support rings.

12. A structure as in claim 11 wherein the projection of the magnetic compression rings in a plane normal to the longitudinal axis of the dynamoelectric machine is a polygon.

13. A structure as in claim 11 wherein the projection of the magnetic compression rings in a plane normal to the longitudinal axis of the dynamoelectric machine is a circle.

14. A structure as in claim 8 wherein each of said plurality of stator tooth assembly axial segments has two ends, a generally cylindrical external surface extending between the two ends and an internal surface extending between the two ends, said stator tooth assembly axial segments being comprised of spaced apart stator teeth having a radial length projecting towards the longitudinal axis of the motor and intertooth links disposed between the stator teeth and forming said external and internal surfaces, said intertooth links having a radial thickness which is relatively small in comparison to the radial length of the stator teeth, said stator tooth assembly axial segments being spaced apart along the longitudinal axis of the dynamoelectric machine, said stator tooth assembly axial segments being formed of punched laminations.

15. A structure as in claim 8 wherein each of said plurality of stator tooth axial assemblies has two ends, a generally cylindrical external surface extending between the two ends and an internal surface extending between the two ends, said stator tooth assembly axial segments being comprised of spaced apart stator teeth having a length projecting towards the longitudinal axis of the motor and intertooth links disposed between the stator teeth and forming said external and internal surfaces, said intertooth links having a radial thickness which is relatively small in comparison to the radial length of the stator teeth, said stator tooth assembly segments being radially spaced apart along the longitudinal axis of the dynamoelectric machine, said stator tooth assembly axial segments being formed of elongate arcuate ferromagnetic strips having inner and outer side edges with the outer edges being thinner than the inner edges, said inner edges having spaced apart notches therein to define the stator teeth.

16. A structure. as in claim 8 wherein each of said plurality of stator tooth axial assembly segments has two ends, a generally cylindrical external surface extending between the two ends and an internal surface extending between the two ends, said stator tooth assembly axial segments being comprised of spaced apart stator teeth having a length projecting towards the longitudinal axis of the dynamoelectric machine and intertooth links disposed between the stator teeth and forming said external and internal surfaces, said intertooth links having a radial thickness which is relatively small in comparison to the radial length of the stator teeth, said stator tooth assembly axial segments being spaced apart along the longitudinal axis of the dynamoelectric machine, said stator tooth assembly axial segments being formed of molded ferromagnetic powder.

17. A structure as in claim 8 wherein each of said plurality of stator tooth assembly axial segments is comprised of a plurality of spaced-apart individual fanfolded stator teeth and spaced-apart individual structural plastic longitudinal support members interposed between the individual stator teeth; said individual fanfolded stator teeth being formed of fanfolded ferromagnetic strips having compressed together folds, said faces of the fanfolded ferromagnetic strip in the individual fanfolded stator teeth lying generally in planes normal to the longitudinal axis of the motor, said structural plastic longitudinal support members being generally disposed parallel to and in a circular array about to the longitudinal axis of the dynamoelectric machine and having generally radially disposed side walls, said individual fanfolded stator teeth having side edges of the faces abutting said side walls of the support members and adhesive means bonding said side edges to said side walls.

18. In a method for fabricating laminated ferromagnetic magnetic circuit components for dynamoelectric machine apparatus from ferromagnetic material in elongate strip form having first and second edges and a longitudinal axis, comprising fanfolding the ferromagnetic strip to provide fanfolds that extend entirely across the strip from said first edge to said second edge with an interfold pitch appropriate to the application with the fanfolds being spaced apart longitudinally of the longitudinal axis of said strip and edge winding the fanfolded material about a mandrel whose longitudinal axis is normal to the nominal plane of the fanfolded ferromagnetic strip stock so that the first edge of the fanfolded ferromagnetic strip adjacent to the mandrel is closely adjacent to said first edge of adjacent turns of the edge wound ferromagnetic strip.

* * * * *